Jan. 6, 1931.  J. H. HILLS  1,787,577
FILTER
Filed Dec. 13, 1928
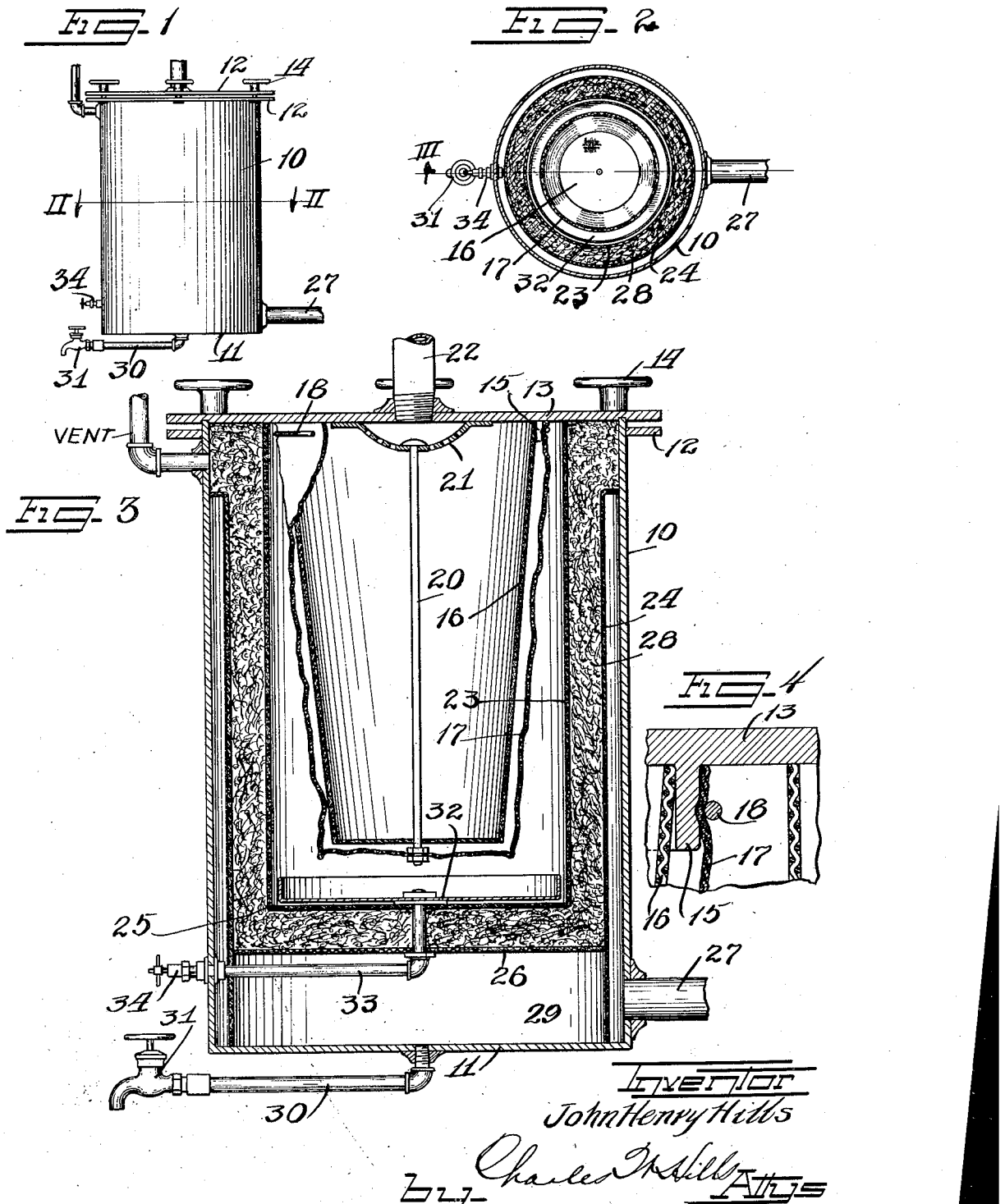
Inventor
John Henry Hills
By Charles F. Hill Attys Patented Jan. 6, 1931

1,787,577

UNITED STATES PATENT OFFICE

JOHN HENRY HILLS, OF GRAND RAPIDS, MICHIGAN, ASSIGNOR TO BOUSMAN MFG. CO., A CORPORATION OF MICHIGAN

FILTER

Application filed December 13, 1928. Serial No. 325,716.

This invention relates to an improved self-contained and inclosed filter structure especially adapted for use with volatile liquids, such as dry cleaning solvents, the filter acting to remove foreign matter and moisture from non-miscible distillates or condensates.

It is an object of this invention to provide an improved filter structure having a relatively large filtering surface to remove foreign matter and permit settling thereof, with a secondary filter medium impervious to water, together with means for easily and rapidly disposing of accumulations of the rejected substances at all stages of the filtration process. The greatly increased filtering surface for a given volume permits the use of more compact or dense filtering media without reducing the normal capacity of the filter.

It is also an object of this invention to provide a compact and inclosed filter sealed against vapor or liquid leakage that can be readily opened up for cleaning or replacing the filtering elements, the removal of the cover carrying with it the inner filtering elements, so that the filter is opened up by removing the cover.

Other and further important objects of this invention will be apparent from the disclosures in the specification and the accompanying drawings.

This invention (in a preferred form) is illustrated in the drawings and hereinafter more fully described.

On the drawings:

Figure 1 is a side elevation of a filter embodying the features of this invention.

Figure 2 is a cross section on the line II—II of Figure 1.

Figure 3 is an enlarged vertical section on the line III—III of Figure 2.

Figure 4 is an enlarged fragmentary detail of the filter cloth mounting.

As shown on the drawings:

A casing 10 which in its simplest form as shown is a cylinder with a bottom closure 11; has a radial flange 12 near its upper end, the end of the cylinder entering a groove in a cover 13 which is held in place by hand nuts 14 engaging the flange 12. The cover has an annular depending flange 15 to the inner surface of which is secured a basket-like shell 16 which may be made of metal screen material as the purpose of this shell is merely to expand or prevent collapsing of a cloth bag 17 secured to the outside of the flange 15 by a wire binding 18. The bag 17 is preferably made of a closely woven fabric chemically treated to be impervious to water but pervious to hydrocarbon fluids, such material per se forming no part of the present invention. The bag 17 and shell 16 are further held in place by a central rod 20 depending from a perforated cup-like member 21 secured to the inner surface of the cover below a clean fluid outlet 22.

In order to relieve the cloth filter from performing other than its water excluding function, a primary filter is provided comprising spaced inner and outer shells or screens 23 and 24 having spaced bottom members 25 and 26, the outer shell 24 and 26 being spaced from the walls and bottom of the container to permit ready entry and distribution of the raw or dirty solvent entering through an inlet pipe 27. By so spacing the outer screen from the container walls, a largely increased filtering area is obtained without increasing the size of the apparatus. The space between the two shells or screens 25 and 26 is filled with closely packed cotton rags or waste 28 to remove solid foreign matter from the solvent.

The cotton rags or waste serve an important function aside from the removal of solids as the passage therethrough of moisture in the finely divided or mist-like form, as contained in solvents or non-miscible liquids, serves to coagulate or gather the water into larger droplets which more readily separate from the non-miscible liquid by gravity settling. Thus, while the rags or waste permit equal passage to the liquid and entrained water, the latter is so physically changed as to render its separation from the liquid an easier process.

The lower portion 29 of the container below the shell bottom 26 also acts as a settling chamber for the larger particles of water carried in suspension, although the finer water particles are carried through the primary filter due to the non-miscible character of the mixture thereof with the solvent. In order to drain off sediment and water from the compartment 29 a drain pipe 30 and valve 31 are provided.

The finely divided water particles pass through the primary filter and reach the final cloth filter which is impervious to water. these fine water particles therefore accumulate on the surface of the cloth and grow in size until they run down the cloth and drop thereoff. A pan 32 is therefore mounted above the inner bottom 25 of the primary filter and is provided with a drain pipe 33 leading through the casing 10 to a valve 34. The pan 32 is purposely spaced above the bottom in order not to reduce the effective filtering area of the primary filter.

In the usual operation of this form of filter in the dry cleaning industry, the distillate or condensate from a solvent recovery apparatus is piped to the inlet connection 27 where it checks its velocity in the chamber 28, permitting the larger solid and liquid particles of foreign matter to settle out. The entering fluid spreads around the bottom and sides of the outer shell of the primary filter, depositing foreign matter therein during its passage. A substantial amount of non-miscible moisture is carried through the primary filter and gathers on the cloth bag 17, dripping onto the pan 32 whence it is drawn off at intervals.

With this arrangement of primary and secondary filters, the latter is not apt to become subject to being clogged with foreign matter over a long period of time, while the primary filter can have its filtering media removed and replaced or washed as frequently as desired, the replacement of the waste or rags being a simple and inexpensive proceeding.

It will thus be seen that I have produced an improved and simplified filter that is highly efficient and can be maintained at its original efficiency at small expense.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a filtering device, a vertical casing having an inlet adjacent the bottom thereof, and an outlet adjacent the top, a removable cover for the said casing, a primary filtering element in the casing disposed in spaced relation to the inlet end and the sides of the casing, the said primary element being sealed relative to the outlet end of the casing whereby the sides and the bottom end of the primary element are exposed to the incoming fluid, a secondary filtering element, impervious to water, mounted in spaced relation with the primary element and between the primary element and the outlet of the casing, and a pan positioned within the said primary element and below the said secondary element to collect water falling from the secondary filter against the upward flow of the body of liquid, the said pan having conduit means in communication therewith leading through the casing.

2. In a filtering device, a vertical casing having an inlet adjacent the bottom thereof, and an outlet adjacent the top, a removable cover for the said casing, a primary filtering element in the casing disposed in spaced relation to the inlet end and the sides of said casing, the said primary element being sealed relative to the outlet end of the casing whereby the sides and the bottom end of the primary element are exposed to the incoming fluid, a secondary filtering element, impervious to water, mounted in spaced relation with the primary element and between the primary element and the outlet of the casing, a pan positioned within the said primary element in spaced relation thereto, and below the said secondary element to collect water falling from the secondary filter, against the upward flow of the body of liquid, the said pan having conduit means in communication therewith leading through the casing.

In testimony whereof I have hereunto subscribed my name at Chicago, Cook County, Illinois.

JOHN HENRY HILLS.